US007146997B2

(12) United States Patent
Francis et al.

(10) Patent No.: US 7,146,997 B2

(45) Date of Patent: Dec. 12, 2006

(54) REGULATOR WITH FLOW DIFFUSER

(75) Inventors: Kevin Francis, Hampton, VA (US); Jason T. Kilgore, Newport News, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 246 days.

(21) Appl. No.: 10/810,677

(22) Filed: Mar. 29, 2004

(65) Prior Publication Data

US 2005/0211307 A1 Sep. 29, 2005

(51) Int. Cl.
*G05D 16/02* (2006.01)
*G05D 16/08* (2006.01)

(52) U.S. Cl. ........................ 137/14; 123/457; 137/508; 137/625.3

(58) Field of Classification Search ................ 137/508, 137/510, 625.3, 14; 123/457, 511, 514
See application file for complete search history.

(56) References Cited

U.S. PATENT DOCUMENTS

| | | | | |
|---|---|---|---|---|
| 3,802,537 | A | 4/1974 | White | |
| 4,108,210 | A * | 8/1978 | Luthe et al. | 138/42 |
| 4,730,786 | A | 3/1988 | Nelson et al. | |
| 5,078,167 | A | 1/1992 | Brandt et al. | |
| 5,261,453 | A * | 11/1993 | Hekkert et al. | 137/625.38 |
| 5,435,345 | A | 7/1995 | Robinson et al. | |
| 5,584,318 | A | 12/1996 | Brandt | |
| 5,718,208 | A | 2/1998 | Brautigan et al. | |
| 5,727,529 | A | 3/1998 | Tuckey | |
| 5,901,742 | A | 5/1999 | Kleppner et al. | |
| 6,158,975 | A | 12/2000 | Dill et al. | |
| 6,269,828 | B1 | 8/2001 | Kilgore et al. | |
| 6,334,460 | B1 | 1/2002 | Hem | |
| 6,505,646 | B1 * | 1/2003 | Singleton | 137/625.3 |
| 2003/0074914 | A1 | 4/2003 | Hirakanu et al. | |

FOREIGN PATENT DOCUMENTS

| | | |
|---|---|---|
| DE | 010 102992 A1 | 7/2002 |
| EP | 1369580 | 12/2003 |
| FR | 2566092 | 12/1985 |
| GB | 157052 | 5/1978 |
| WO | WO 03104642 | 12/2003 |

* cited by examiner

*Primary Examiner*—Stephen M. Hepperle

(57) ABSTRACT

A flow-through pressure regulator having a housing, and a divider. The housing includes an inlet and an outlet disposed along a longitudinal axis. The divider separates the housing into a first chamber and a second chamber, and includes a seat, a diaphragm, a retainer and a flow diffuser member. The seat defines a passage between the first and second chambers. The diaphragm extends between the housing and the seat. The retainer secures the diaphragm to the seat, and may include a base portion proximate the seat, an intermediate portion extending along the longitudinal axis from the base portion toward the outlet, an end portion extending from the intermediate portion, and at least one aperture having a flow axis that permits fluid communication between the passage and the second chamber. The flow diffuser member is disposed between the passage and the outlet, and defines a plurality of flow paths.

17 Claims, 3 Drawing Sheets

REGULATOR WITH FLOW DIFFUSER

FIELD OF THE INVENTION

This invention relates to a pressure regulator for automotive fuel systems, and more particularly to a flow through pressure regulator having a diffuser to reduce flow noise.

BACKGROUND OF THE INVENTION

Most modern automotive fuel systems utilize fuel injectors to deliver fuel to the engine cylinders for combustion. The fuel injectors are mounted on a fuel rail to which fuel is supplied by a pump. The pressure at which the fuel is supplied to the fuel rail must be controlled to ensure the proper operation of the fuel injectors. Pressure is controlled using pressure regulators that control the pressure of the fuel in the system at all engine r.p.m. levels.

Fuel flow rate through known pressure regulators tends to be low at high engine speed, as large quantities of fuel are consumed in the combustion process. At low engine speeds, less fuel is consumed in combustion and flow rates through the pressure regulators are high. These high fuel flow rates can produce unacceptably high noise levels.

A known pressure regulator includes a divider having a seat, a diaphragm and a retainer. The divider separates a housing into a first chamber and a second chamber. The seat defines a passage extending along a longitudinal axis of the housing between the first and second chambers. The seat includes a first portion proximate the first chamber having a first cross-sectional area and a second portion proximate the second chamber and having a second cross-sectional area. The first cross-sectional area is greater than the second cross-sectional area. The diaphragm extends between the housing and the seat. The retainer includes a plurality of apertures having a flow axis oriented along the longitudinal axis. The apertures diffuse flow and reduce operational noise of the regulator.

It is believed that there is a need for a pressure regulator that reduces flow-related noise at high fuel flow rates more than the known pressure regulator, while still being inexpensive to manufacture.

SUMMARY OF THE INVENTION

In an embodiment, the invention provides a flow-through pressure regulator having a housing, and a divider. The housing includes an inlet and an outlet disposed along a longitudinal axis. The divider separates the housing into a first chamber and a second chamber, and includes a seat, a diaphragm, a retainer and a flow diffuser member. The seat defines a passage between the first and second chambers, the passage having a flow area. The diaphragm extends between the housing and the seat. The retainer secures the diaphragm to the seat, and may include a base portion proximate the seat, an intermediate portion extending along the longitudinal axis from the base portion toward the outlet, an end portion extending from the intermediate portion, and at least one aperture having a flow axis that permits fluid communication between the passage and the second chamber. The aperture has a flow area that is less than the seat passage flow area. The flow diffuser member is disposed between the passage and the outlet, and defines a plurality of flow paths. Each of the flow paths has a flow area that is less than the aperture flow area. The flow-through pressure regulator includes a closure member being arranged between first and second configurations relative to the seat. In the first configuration, the closure member substantially prevents fluid communication through the passage. In the second configuration, the closure member substantially permits fluid communication through the passage.

The flow diffuser member may include a plurality of segments that form a grid to define the plurality of flow paths. The segments may be formed of wire, and my be woven to form the grid. The flow diffuser member may be a mesh screen. The flow diffuser member may be formed as a unitary member so that the plurality of flow paths are formed in the unitary member. The flow diffuser member may be disposed between the passage and the aperture. The flow diffuser member may be circular in form, having an outer diameter that is larger than an inner diameter of the retainer so that the flow diffuser member is press-fit in the retainer, for example at the intermediate portion. The flow diffuser member may be disposed between the aperture and the outlet. The flow diffuser member may be circular in form, having a cylindrical side wall with an inner diameter that is shorter than an outer diameter of the retainer, so that the flow diffuser member is press-fit on the retainer, for example at the end portion.

The seat, the intermediate portion and the end portion may define a collection chamber in fluid communication with the passage and the aperture. A resilient element may extend along the longitudinal axis and bias the divider toward the closure member. The housing may include first and second housing parts, the first housing part including the inlet and defining the first chamber, and the second housing part including the outlet and defining the second chamber. The diaphragm may include a first perimeter sandwiched between the first and second housing parts. The base portion may include an annular portion extending outwardly from the intermediate portion relative to the longitudinal axis. The diaphragm may include a second perimeter sandwiched between the seat and the annular portion. The resilient element may include a first end that engages the second housing part and a second end that engages the annular portion.

In another embodiment, the invention provides a method of diffusing fluid flow through a pressure regulator. The pressure regulator includes a divider having a seat, a diaphragm, a retainer, and a flow diffuser member. The retainer includes at least one aperture. The flow diffuser member is in cooperative engagement with the retainer, and defines a plurality of flow paths. The divider separates a housing into a first chamber and a second chamber. The housing has a longitudinal axis. The seat defines a passage extending along the longitudinal axis between the first and second chambers. The diaphragm extends between the housing and the seat. The method includes flowing the fluid through the passage, flowing the fluid through the diffuser member, and flowing the fluid through the aperture.

The step of flowing the fluid through the diffuser member may be before the step of flowing the fluid through the aperture. The step of flowing the fluid through the aperture may be before the step of flowing the fluid through the diffuser member. The method may include flowing the fluid from the passage through a collection chamber to the aperture.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain features of the invention.

DETAILED DESCRIPTION OF THE PREFERRED EMBODIMENTS

Figure 1:
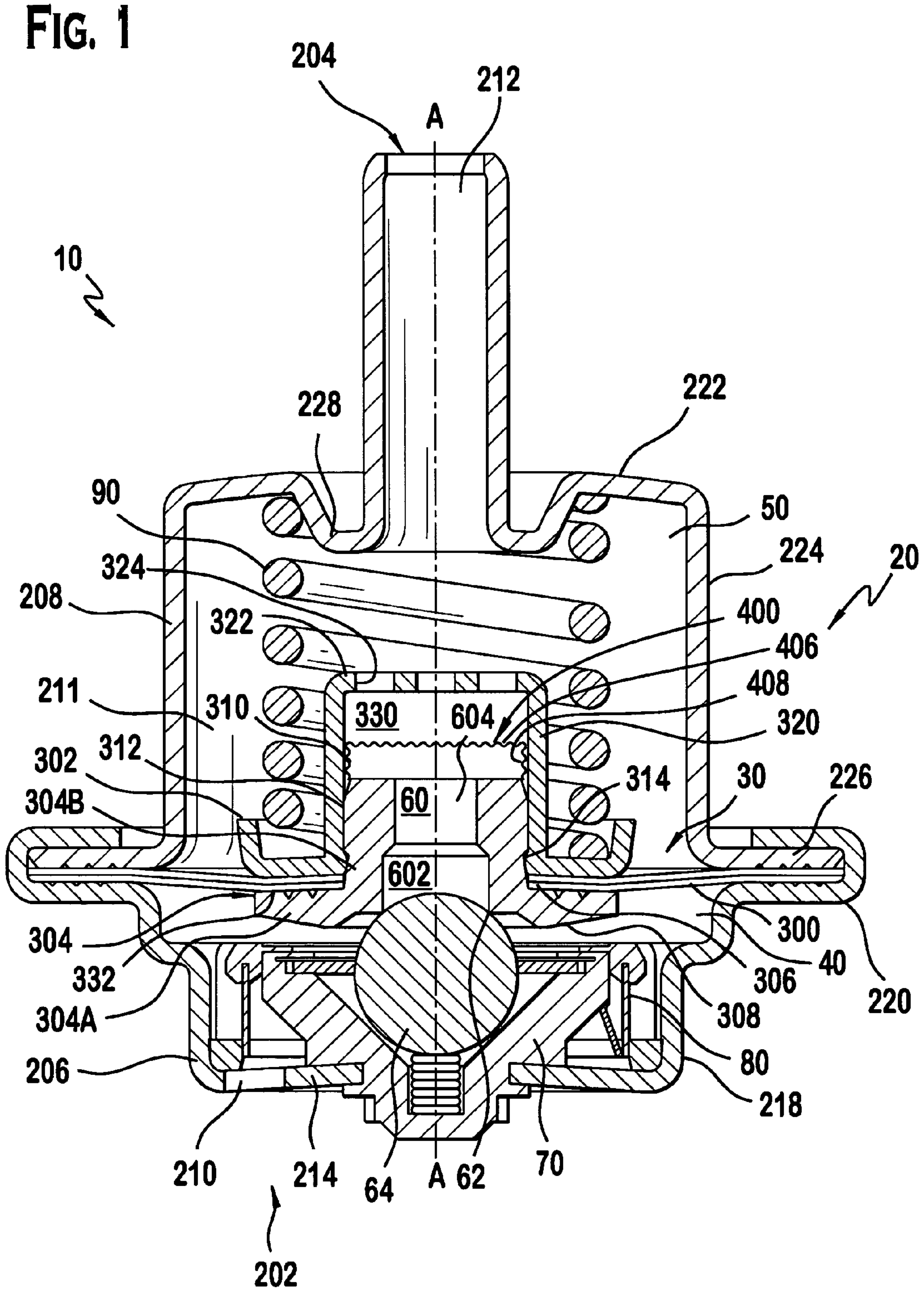
FIG. 1 is a flow-through pressure regulator having a flow diffuser member, according to an embodiment of the invention.

FIG. 1 illustrates a flow-through pressure regulator 10 according to a preferred embodiment. The flow-through pressure regulator 10 includes a housing 20. The housing 20 is separated by a divider 30 into a first chamber 40 and a second chamber 50. The divider 30 has a passage 60 that communicates the first chamber 40 with the second chamber 50. A closure member 70 permits or inhibits flow through the passage 60. A filter 80 may be disposed in the flow path of the housing 20. The housing 20 has an inlet 202 and an outlet 204 offset along a longitudinal axis A—A. The housing 20 can include a first housing part 206 and a second housing part 208 that are crimped together to form a unitary housing 20 with a hollow interior 211. Although the unitary housing is formed by two joined members, it is to be understood that the unitary housing could be formed with multiple members integrated together or, alternatively, a monolithic member. The inlet 202 of the housing 20 is located in the first housing part 206, and the outlet 204 of the housing 20 is located in the second housing part 208. The inlet 202 can be a plurality of apertures 210 located in the first housing part 206. The outlet 204 can be a port 212 disposed in the second housing part 208.

The first housing part 206 can include a first base 214, a first lateral wall 218 extending in a first direction along the longitudinal axis A—A from the first base 214, and a first flange 220 extending from the first lateral wall 218 in a direction substantially transverse to the longitudinal axis A—A. The second housing part 208 can include a second base 222, a second lateral wall 224 extending in a second direction along the longitudinal axis A—A from the second base 222, and a second flange 226 extending from the second lateral wall 224 in a direction substantially transverse to the longitudinal axis A—A. The divider 30, which can include a diaphragm 300, is secured between the first flange 220 and the second flange 226 to separate the first chamber 40 and the second chamber 50. The first flange 220 can be rolled over the circumferential edge of the second flange 226 and can be crimped to the second flange 226 to form the unitary housing 20.

A first biasing element 90, which is preferably a spring, is located in the second chamber 50. The first biasing element 90 engages a locator 228 on the base 222 of the second housing part 208 and biases the divider 30 toward the base 214 of the first housing part 206. The first biasing element 90 biases the divider 30 of the regulator 10 at a predetermined force, which relates to the pressure desired for the regulator 10. The base 222 of the second housing part 208 has a dimpled center portion that provides the outlet port 212 in addition to the locator 228. The first end of the spring 90 is secured on the locator 228, while the second end of the spring 90 can be supported by a retainer 302, which is secured to a valve seat 304 mounted in a central aperture 306 in the diaphragm 300.

In a preferred embodiment, the valve seat 304 is suspended by the diaphragm 300 in the housing 20, and provides the passage 60 that includes a first section 602 and a second section 604. The valve seat 304 has a first seat portion 304A and a second seat portion 304B disposed along the longitudinal axis A—A. The first seat portion 304A is disposed in the first chamber 40 and the second seat portion 304B is disposed in the second chamber 50. The first section 602 of the passage 60 extends along the longitudinal axis A—A in both the first portion 304A and the second portion 304B of the valve seat 304. The second section 604, which also extends along the longitudinal axis A—A, is in the second portion 304B of the valve seat 304.

The valve seat 304 preferably has a first surface 308 disposed in the first chamber 40, a second surface 310 disposed in the second chamber 50, and a side surface 312 extending between the first surface 308 and the second surface 310. The first section 602 of the passage 60 communicates with the first surface 308. The second section 604 of the passage 60 communicates with the first section 602 and the second surface 310. The first section 602 has a first cross-sectional area and the second section 604 has a second cross-sectional area that is smaller than the first cross-sectional area. The cross-sectional areas of the first section 602 and the second section 604 are greater than the cross-sectional areas of each of a plurality of apertures 324 described below in more detail. The side surface 312 of the valve seat 304 may include an undercut edge 314 that may enhance the press-fitted connection between the retainer 302 and the valve seat 304. It should be noted that the valve seat 304 of a preferred embodiment can be a monolithic valve seat or, alternatively, separate components that can be assembled.

At an end of the passage 60 opposite the second seat surface 310 is a seating surface 62 for seating the closure member 70, which can be a valve actuator ball 64. In the manufacturing of the valve seat 304, the seating surface 62 is finished to assure a smooth sealing surface for the ball 64.

In a preferred embodiment, the retainer 302 includes an intermediate portion 320 in the form of a cylinder that extends along the longitudinal axis A—A. It is to be understood, however that, intermediate portion 320 could be in the form of other geometric shapes known in the art. According to a preferred embodiment, an inner surface of the intermediate portion 320 is press-fitted with respect to the side surface 312 of the seat 304, and may cooperatively engage the undercut edge 314.

The retainer 302 also includes an end portion 322 that extends radially inward from the intermediate portion 320 in a direction substantially transverse to the longitudinal axis A—A. In a preferred embodiment, the end portion 322 is integrally formed with the intermediate portion 320. For example, the end portion 322 and the intermediate portion 320 may be formed of a flat sheet of metal that is stamped into form. Of course, it is to be understood that the end portion 322 and the intermediate portion 320 may be formed separately and joined. The intermediate portion 320 and the end portion 322 form a chamber 330 in fluid communication with the passage 60, and the plurality of apertures 324 formed in the end portion 322. The plurality of apertures 324 may be stamped in the end portion 322 while end portion 322, and integral intermediate portion 320, are in the flat condition. Apertures 324 may have flow axis' concentric with the longitudinal axis A—A. Apertures 324 permit fluid communication between the passage 60 and the second chamber 50.

In a preferred embodiment, the retainer 302 also includes a base portion 332 that extends from the intermediate portion 320 in a generally radially outward direction relative to the longitudinal axis A—A. The base portion 332 is disposed along the longitudinal axis A—A from the end portion 322 and, in cooperation with the first seat portion 304A, sandwiches the diaphragm 300, thereby coupling the diaphragm 300 to the valve seat 304. The base portion 332 also serves to support and to locate the second end of the spring 90 with respect to the divider 30. In a preferred embodiment, the base portion 332 is formed in substantially the same stamping operation and from the same sheet of metal as the intermediate portion 320 and the end portion 322.

The flow-through pressure regulator 10 includes a flow diffuser member 400 disposed between the passage 60 and the outlet 204. As shown in the embodiment of FIG. 1, flow diffuser member 400 is disposed between the passage 60 and the apertures 324. Flow diffuser member 400 reduces flow-related noise at high fuel flow rates by forming multiple flow paths. Flow-related noise is proportional to the flow area of flow paths. Large area flow paths allow turbulent flow, thereby allowing high levels of flow-related noise. The multiple flow paths of the flow diffuser member 400 reduce flow-related noise by reducing the flow area of the flow paths.

Figure 2A:
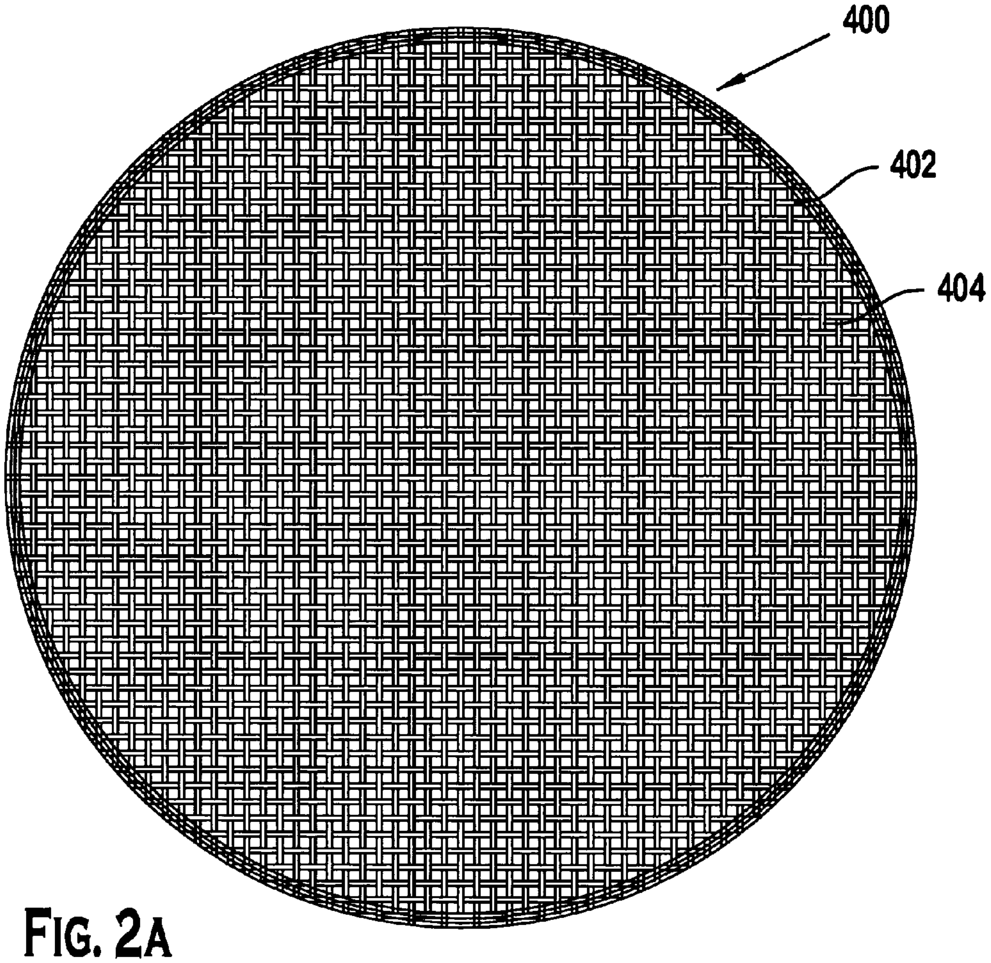
FIG. 2*a* is plan view of the flow diffuser member of FIG. 1.
Figure 2B:
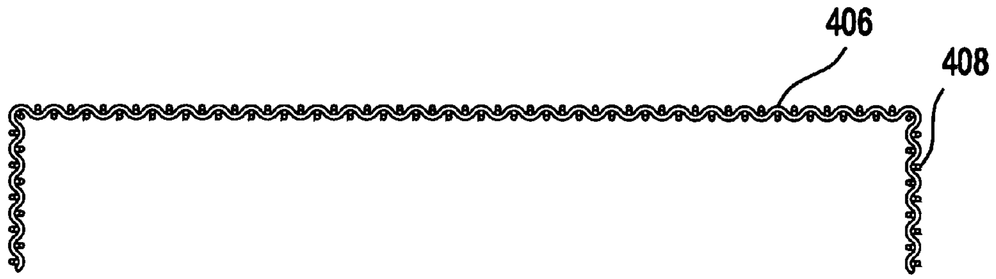
FIG. 2*b* is a side view of the flow diffuser member of FIG. 1.

As shown in FIGS. 2*a* and 2*b*, flow diffuser member 400 may be formed of a plurality of segments 402 forming a grid, such that the segments define the multiple flow paths 404. Each of the flow paths 404 have a flow area that is less than the flow area of each of the retainer apertures 324. As shown, the segments 402 are formed of wire, and are woven to form a mesh screen. However it is to be understood that flow diffuser member 400 may be formed in any suitable manner, so long as flow diffuser member 400 forms multiple flow paths 404. For example, the flow diffuser member 400 may be formed as a unitary plate member having the plurality of flow paths 404 stamped in the unitary plate member, or flow diffuser member 400 may be formed as a plastic injection molded grid.

In the case where the flow diffuser member 400 is formed of a wire mesh screen, the total percentage of open area of the mulitple flow paths 404 is dependent on the number of wire segments 402 per square inch, and the diameter of the wire segments 402. In an exemplary test, the decrease in flow-related noise was measured using a flow diffuser member formed of a wire mesh screen having a 35% total open area of the mulitple flow paths. At a flow rate of 93.7 kg fuel/hr, a noise level of 56.4 Sones was measured without the flow diffuser member. At the same flow rate, a noise level of 28.3 Sones was measured with the flow diffuser member.

Referring back to FIG. 1, the flow diffuser member 400 may include a top portion 406 oriented in a substantially transverse manner with respect to the longitudinal axis A—A. Flow diffuser member 400 may include side portion 408 extending from top portion 406 in the direction of longitudinal axis A—A and substantially parallel to intermediate portion 320 of the retainer 302. The side portion 408 may have an outer diameter that is larger than in inner diameter of the retainer 302 so that flow diffuser member 400 may be press-fit in the retainer 302 with side portion 408 abutting the second surface 310 of the valve seat 304, and an outer surface of side portion 408 mating with an inner surface of intermediate portion 320.

Figure 3:
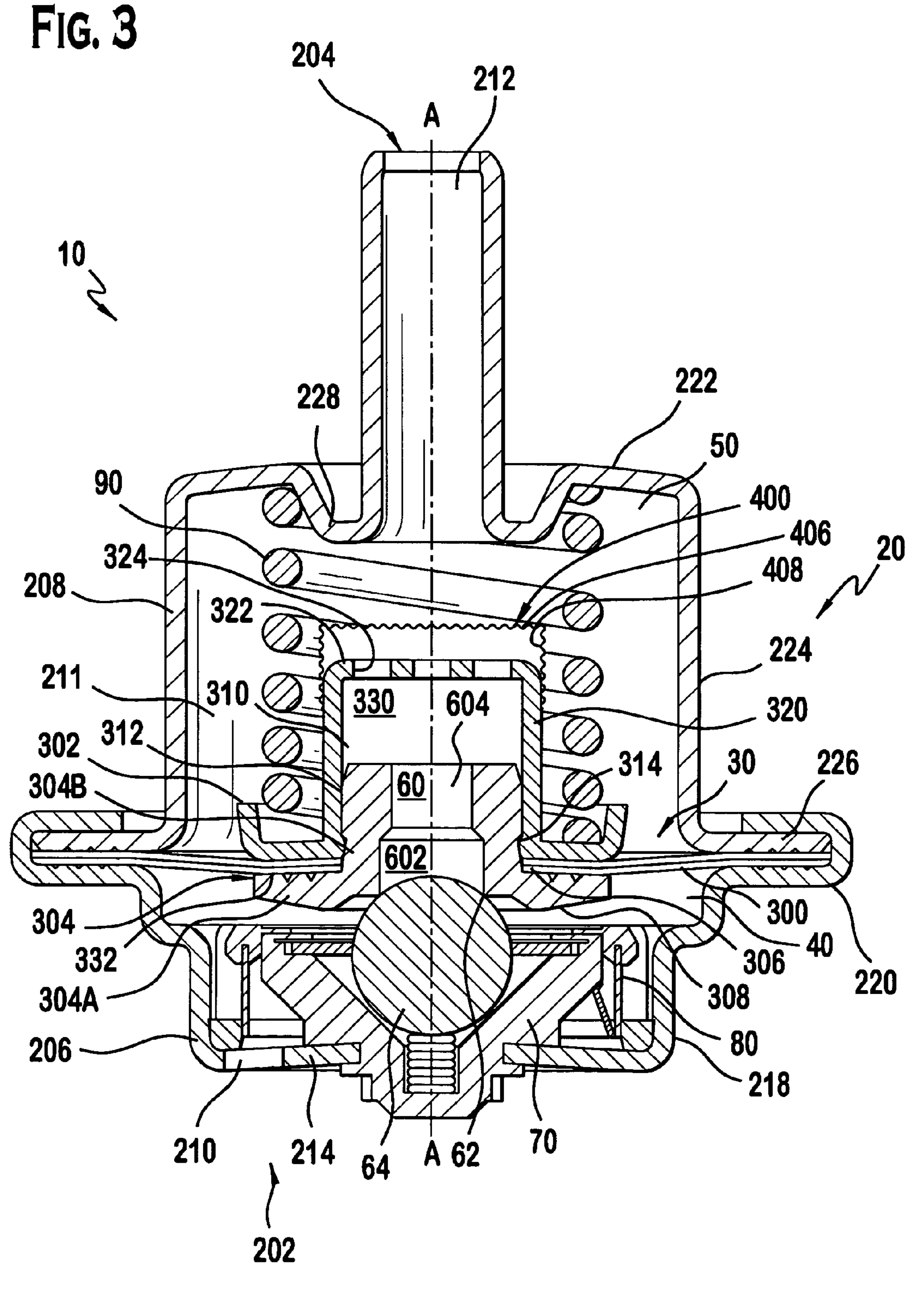
FIG. 3 is a flow-through pressure regulator having a flow diffuser member, according to another embodiment of the invention.

FIG. 3 illustrates a flow-through pressure regulator 10 according to another embodiment, where the flow diffuser member 400 is disposed between the apertures 324 and the outlet 204. In the embodiment of FIG. 3, side portion 408 has an inner diameter that is shorter than an outer diameter of the retainer 302, so that the flow diffuser member is press-fit on the retainer 302.

One method of assembling the fuel regulator 10 is by coupling, such as by staking or press-fitting, the closure member 70 to the first housing part 206. The divider 30 is assembled by locating the valve seat 304 in the central aperture 306 of the diaphragm 300, and then press-fitting the retainer 302 with respect to the seat 304 such that the side surface 312 contiguously engages the intermediate portion 320. The assembled divider 30 is located with respect to the upper flange surface 220 of the first housing part 206. The bias spring 90 is positioned in the retainer 302 and the second housing part 208 is then placed over the spring 90. The flange 220 of the first housing part 206 is crimped down to secure the second housing part 208. The first and second housing parts 206,208 and the diaphragm 300 form the first and second chambers 40,50, respectively. The pressure at which the fuel is maintained is determined by the spring force of the bias spring 90.

The operation of the pressure regulator and a method of diffusing fluid flow through the pressure regulator will now be described. The bias spring 90 acts through the retainer 302 to bias the divider 30 toward the base 214 of the first housing part 206. When the ball 64 is seated against surface 62, the pressure regulator 10 is in a closed configuration and no fluid can pass through the pressure regulator 10.

Fluid enters the pressure regulator 10 through apertures 210 and exerts pressure on the divider 30. When the pressure of the fluid is greater than the force exerted by the bias spring 90, the diaphragm 300 moves in an axial direction and the ball 64 leaves the seating surface 62 of the valve seat member 304. This is the open configuration of the pressure regulator 10. Fluid can then flow through the regulator 10. From the first chamber 40, the fluid enters the passage 60, and then passes into the collection chamber 330 and through the plurality of flow paths 404 formed by the flow diffuser member 400. From the plurality of flow pathes 404, the fluid passes through the apertures 324 in the direction of the longitudinal axis A—A into the second chamber 50, before leaving the pressure regulator through the outlet 204.

As the incoming fuel pressure is reduced, the force of the bias spring 90 overcomes the fuel pressure and returns the valve seat member 304 to seated engagement with the ball 64, thus closing the passage 60 and returning the pressure regulator to the closed configuration.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A flow-through pressure regulator, comprising:

a housing having an inlet and an outlet disposed along a longitudinal axis;

a divider separating the housing into a first chamber and a second chamber, the divider including:

a seat defining a passage between the first and second chambers, the passage having a flow area;

a diaphragm extending between the housing and the seat;

a retainer securing the diaphragm to the seat, the retainer including:

a base portion proximate the seat;

an intermediate portion extending along the longitudinal axis from the base portion toward the outlet;

an end portion extending from the intermediate portion; and at least one aperture having a flow axis, the aperture having a flow area that is less than the passage flow area, the aperture permitting fluid communication between the passage and the second chamber; and a flow diffuser member including a plurality of segments forming a grid and including a portion disposed generally orthogonal to the longitudinal axis between the passage and the outlet, the segments of the flow diffuser member defining a plurality of flow paths, each of the flow paths having a flow area that is less than the aperture flow area; and a closure member being arranged between first and second configurations relative to the seat, the first configuration substantially preventing fluid communication through the passage, and the second configuration permitting fluid communication through the passage.

2. The flow-through pressure regulator of claim 1, wherein the segments are formed of wire.

3. The flow-through pressure regulator of claim 2, wherein the segments are woven to form the grid.

4. The flow-through pressure regulator of claim 1, wherein the flow diffuser member is a mesh screen.

5. The flow-through pressure regulator of claim 1, wherein the flow diffuser member is formed as a unitary member, the plurality of flow paths being formed in the unitary member.

6. The flow-through pressure regulator of claim 1, wherein the flow diffuser member is disposed between the passage and the at least one aperture.

7. The flow-through pressure regulator of claim 6, wherein the flow diffuser member is circular in form, having an outer diameter that is longer than an inner diameter of the retainer, so that the flow diffuser member is press-fit in the retainer.

8. The flow-through pressure regulator of claim 7, wherein the flow diffuser member is press-fit in the retainer at the intermediate portion.

9. The flow-through pressure regulator of claim 1, wherein the flow diffuser member is disposed between the at least one aperture and the outlet.

10. The flow-through pressure regulator of claim 9, wherein the flow diffuser member is circular in form, having a cylindrical side wall with an inner diameter that is shorter than an outer diameter of the retainer, so that the flow diffuser member is press-fit on the retainer.

11. The flow-through pressure regulator of claim 10, wherein the flow diffuser member is press-fit on the retainer at the end portion.

12. The flow-through pressure regulator of claim 1, wherein the seat, the intermediate portion, and the end portion define a collection chamber in fluid communication with the passage and the at least one aperture.

13. The flow-through pressure regulator of claim 1, further comprising:

a resilient element extending along the longitudinal axis and biasing the divider toward the closure member, wherein the housing includes first and second housing parts, the first housing part including the inlet and defining the first chamber, and the second housing part including the outlet and defining the second chamber, wherein the diaphragm includes a first perimeter sandwiched between the first and second housing parts, wherein the base portion includes an annular portion extending outwardly from the intermediate portion relative to the longitudinal axis, wherein the diaphragm includes a second perimeter being sandwiched between the seat and the annular portion, and wherein the resilient element includes a first end engaging the second housing part and a second end engaging the annular portion.

14. A method of diffusing fluid flow through a pressure regulator, the pressure regulator including a divider, the divider including a seat, a diaphragm, a retainer, and a flow diffuser member including a plurality of segments forming a grid and including a portion disposed generally orthogonal to a longitudinal axis, the retainer having at least one aperture, the segments of the flow diffuser member in cooperative engagement with the retainer, the flow diffuser member defining a plurality of flow paths, the divider separating a housing into a first chamber and a second chamber, the seat defining a passage extending along the longitudinal axis between the first and second chambers, and the diaphragm extending between the housing and the seat, the method comprising:

flowing the fluid through the passage in a direction generally parallel to the longitudinal axis;

flowing the fluid through the grid of the flow diffuser member; and flowing the fluid through the at least one aperture.

15. The method of claim 14, wherein the flowing the fluid through the diffuser member is before the flowing the fluid through the at least one aperture.

16. The method of claim 14, wherein the flowing the fluid through the at least one aperture is before the flowing the fluid through the diffuser member.

17. The method of claim 14, further comprising:

flowing the fluid from the passage through a collection chamber to the at least one aperture.

* * * * *